(12) United States Patent
Resan et al.

(10) Patent No.: US 7,688,493 B2
(45) Date of Patent: Mar. 30, 2010

(54) NON-FOURIER PULSE-SHAPERS INCLUDING A COMBINED PULSE-SHAPER AND PULSE-COMPRESSOR

(75) Inventors: Bojan Resan, San Jose, CA (US); Alan Fray, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 165 days.

(21) Appl. No.: 11/811,462

(22) Filed: Jun. 11, 2007

(65) Prior Publication Data

US 2008/0304127 A1 Dec. 11, 2008

(51) Int. Cl.
 *G02B 26/00* (2006.01)
(52) U.S. Cl. ...................................... 359/238
(58) Field of Classification Search ................ 359/237, 359/238, 305, 308, 310, 284, 285, 563, 566, 359/559, 687, 688, 689, 690, 438, 496, 514, 359/569, 570, 571, 573, 606, 640, 669, 831
 See application file for complete search history.

(56) References Cited

U.S. PATENT DOCUMENTS

| | | | |
|---|---|---|---|
| 4,655,547 A | 4/1987 | Heritage et al. ........ 350/162.12 |
| 4,928,316 A | 5/1990 | Heritage et al. ............. 455/600 |
| 5,166,818 A | 11/1992 | Chase et al. ................. 359/170 |
| 5,526,171 A | 6/1996 | Warren ........................ 359/285 |
| 6,081,379 A | 6/2000 | Austin et al. ................. 359/584 |
| 6,115,402 A | 9/2000 | Caprara ....................... 372/101 |
| 6,154,318 A | 11/2000 | Austin et al. ................. 359/584 |
| 6,327,068 B1 | 12/2001 | Silberberg et al. .......... 359/239 |
| 6,577,782 B1 | 6/2003 | Leaird et al. .................. 385/15 |
| 6,621,613 B2 | 9/2003 | Silberberg et al. .......... 359/239 |
| 6,724,783 B2 | 4/2004 | Jalali et al. ..................... 372/9 |
| 2003/0223748 A1* | 12/2003 | Stowe et al. ................... 398/48 |
| 2004/0233944 A1 | 11/2004 | Dantus et al. .................. 372/25 |
| 2005/0017160 A1 | 1/2005 | Wolleschensky et al. .... 250/234 |
| 2005/0232317 A1 | 10/2005 | Dantus et al. .................. 372/32 |
| 2006/0033923 A1 | 2/2006 | Hirasawa et al. ............. 356/450 |
| 2006/0056468 A1 | 3/2006 | Dantus et al. .................. 372/28 |
| 2006/0186327 A1 | 8/2006 | Wolleschensky et al. .... 250/234 |

\* cited by examiner

*Primary Examiner*—Ricky L Mack
*Assistant Examiner*—Tuyen Q Tra
(74) *Attorney, Agent, or Firm*—Morrison & Foerster LLP

(57) ABSTRACT

A pulse-shaper for temporally shaping an optical pulse includes a prism or a grism arranged to disperse the optical pulse into a diverging fan of spectral-component rays. The fan of spectral-component rays is collimated by a lens or another grism. The collimated spectral-component rays are selectively modulated by a spatial-light-modulator (SLM). The modulated rays from the SLM are either recombined to form the temporally shaped pulse by another lens and another prism, another two grisms, or by the same lens and prism or the same two grisms.

16 Claims, 7 Drawing Sheets

NON-FOURIER PULSE-SHAPERS INCLUDING A COMBINED PULSE-SHAPER AND PULSE-COMPRESSOR

TECHNICAL FIELD OF THE INVENTION

The present invention relates generally to ultrafast lasers. The invention relates in particular to manipulating the spectral and temporal characteristics of laser pulses delivered by an ultrafast laser or an ultrafast laser plus an amplifier, adjusting either the amplitude or the phase of input ultrafast pulses and thereby controlling the pulse bandwidth or spectral content of shaped pulses.

DISCUSSION OF BACKGROUND ART

Pulse shaping is desirable in many applications involving ultrafast laser pulses. A notable example of such an application is the adjustment of pulse bandwidth to enhance pulse compression and consequently enable the generation of pulses having a shorter duration than those obtained directly from an ultrafast laser oscillator. Pulse shaping can be achieved through the well-known technique of spatially dispersing the spectral content of a pulse using a diffraction grating, transforming the pulse into a Fourier-plane using appropriate imaging optics, then manipulating the amplitude or phase of the dispersed spectral-components of the pulse in the Fourier-plane using a spatial light modulator (SLM). The modulated spectral components are then re-transformed to the time domain with an additional imaging optics and a second grating or by back-propagating the pulse through the input optics in reverse order to obtain a modified (temporally shaped) pulse.

Most prior-art such pulse-shaping schemes are commonly optimized for a specific pulse bandwidth and can yield degraded performance when attempting to manipulate pulses with spectral content differing from that anticipated by the nominal optical configuration. Schemes for shaping pulses having different spectral bandwidths are described in U.S. patent application Ser. No. 11/602,147, filed Nov. 20, 2006, assigned to the assignee of the present invention and incorporated herein by reference. All of these schemes are complicated by a preference for locating the SLM in a Fourier-transform plane (Fourier-plane). Apparatus for implementing the schemes is relatively complex and relatively bulky, for example having a volume of about 1 cubic foot. It would be useful if acceptable pulse-shaping performance could be achieved by simpler and more compact apparatus. It would also be useful if a compact pulse-shaping apparatus could also provide pulse compression thereby eliminating the need for additional apparatus for providing this function

SUMMARY OF THE INVENTION

In one aspect, apparatus in accordance with the present invention for temporally shaping an optical pulse comprises a wavelength-dispersive optical device and a first optical device having positive optical power. A spatial-light-modulator arrangement is located at a distance from the positive-optical-power device significantly less than the focal length thereof, i.e., definitely not at a Fourier plane of the positive-optical power device. The first wavelength-dispersive optical device is arranged to disperse the optical pulse into a diverging fan of rays corresponding to spectral-components of the pulse, and the spatial-light-modulator arrangement is arranged to selectively modulate said spectral-component rays.

In one preferred embodiment of the present invention the positive-optical-power device is a lens. By not locating the spatial-light-modulator arrangement in a Fourier plane of the lens, the apparatus can be made more compact than a prior-art pulse-shaper using the same wavelength-dispersive device.

In another aspect, apparatus in accordance with the present invention for temporally shaping and compressing an optical pulse comprises a first wavelength-dispersive optical device arranged to disperse the optical pulse into a diverging fan of rays corresponding to spectral-components of the pulse. A second wavelength-dispersive optical device is arranged to provide a wavelength dependent delay of the spectral-component rays and a spatial-light-modulator arrangement is provided for selectively modulating the spectral-component rays. The spectral-component rays, delayed and selectively modulated, are optically recombined to provide the compressed, temporally shaped optical pulse.

DETAILED DESCRIPTION OF THE INVENTION

Figure 1:
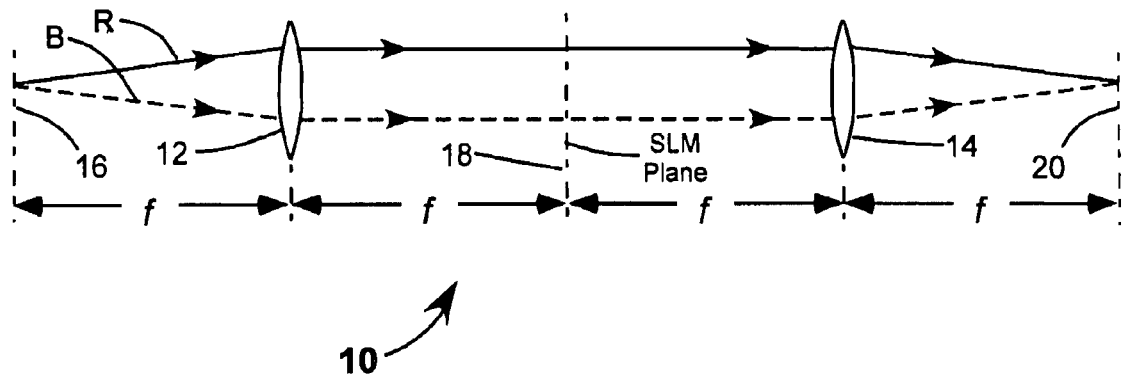
FIG. 1 schematically illustrates a general arrangement of a prior-art pulse-shaper in which a pulse is dispersed at an input plane into a fan of rays corresponding to spectral components of the pulse, the spectral-component rays are collimated by a first optical element having a focal length and located a focal length thereof away from the input plane, the collimated spectral-component rays are modulated by a spatial-light-modulator (SLM) located in a plane a focal length of the first optical element away from the first optical element, the modulated, collimated spectral-component rays are focused by a second optical element having the focal length of the first optical element and located a focal length thereof away from the SLM, and the focused, modulated spectral-component rays are reassembled into a temporally shaped pulse in an output plane a focal length away from the second optical element.

Before proceeding with a detailed description of preferred embodiments of the present invention, the characteristic of prior-art pulse shaping apparatus that causes such apparatus to be bulky is first briefly described with reference to FIG. 1. Here, an optical arrangement 10 includes positive lenses 12 and 14, each having a focal length f. Lenses 12 and 14 are axially spaced apart by a distance 2f, i.e., twice the focal length of the lenses. A wavelength-dispersive optical element (not shown), such as a prism or a diffraction grating, is placed at an input plane 16 at a distance f from lens 12. A transmissive linear spatial-light-modulator SLM (also not shown) is located in a plane 18 midway between lenses 12 and 14, i.e., at a distanced f from each lens. Plane 18 is the so-called Fourier-plane of prior-art pulse shaping apparatus.

The wavelength-dispersive device spreads an input pulse (beam) into a "fan" of rays diverging in the plane of the drawing. The fan is bounded by a longest-wavelength ray R and a shortest-wavelength ray B. There are rays of decreasing wavelength at corresponding angles from ray R to ray B. These can be defined as spectral-component rays of the pulse. The angle between rays R and B is dependent, inter alia, on the spectral bandwidth of the pulses and properties of the wavelength-dispersive device. Lens 12 collimates the diverging rays, which are then incident on the spatial light modulator in plane 18. Elements of the modulator are adjusted to change the phase or amplitude of certain of the rays (spectral components of the pulse). The amplitude-modulated or phase-modulated rays are then incident on lens 14. A wavelength-dispersive device identical to the wavelength-dispersive device in plane 16 is located in plane 20 and reassembles the spectral components of the pulse to provide a temporally shaped pulse. This is a schematic example of the so-called Fourier optics arrangement (often referred to as a 4f arrangement) which is found in all prior-art pulse-shapers. Such prior-art pulse-shapers are referred to hereinbelow as Fourier-plane pulse-shapers. It is the 4f requirement (straight or folded) that makes such pulse-shapers bulky.

By way of example, if a prism is used as a wavelength dispersive device, f may need to be on the order of 1 meter in order that spectral elements of the pulse can fill the SLM to achieve maximum resolution for that SLM. This means that the total optical path length of apparatus 10 would need to be 4 meters. If a reflective SLM is placed at plane 18, lens 14 can be omitted. Modulated spectral components will be returned to lens 12 and focused back into plane 14 to be re-assembled into a temporally shaped pulse by the wavelength-dispersive device in that plane. This will reduce the total path length to 2f (2 meters in this example). This can be described as "folded" 4f-configuration.

Embodiments of the present invention are based on a premise that a 4f-configuration (or a folded 4f-configuration) is not necessary for adequate functioning of a pulse-shaper. This provides for significant optical-path shortening in the inventive pulse-shapers compared with prior-art pulse-shapers, as will be evident from the detailed description of preferred embodiments of the invention set forth below.

Figure 2:
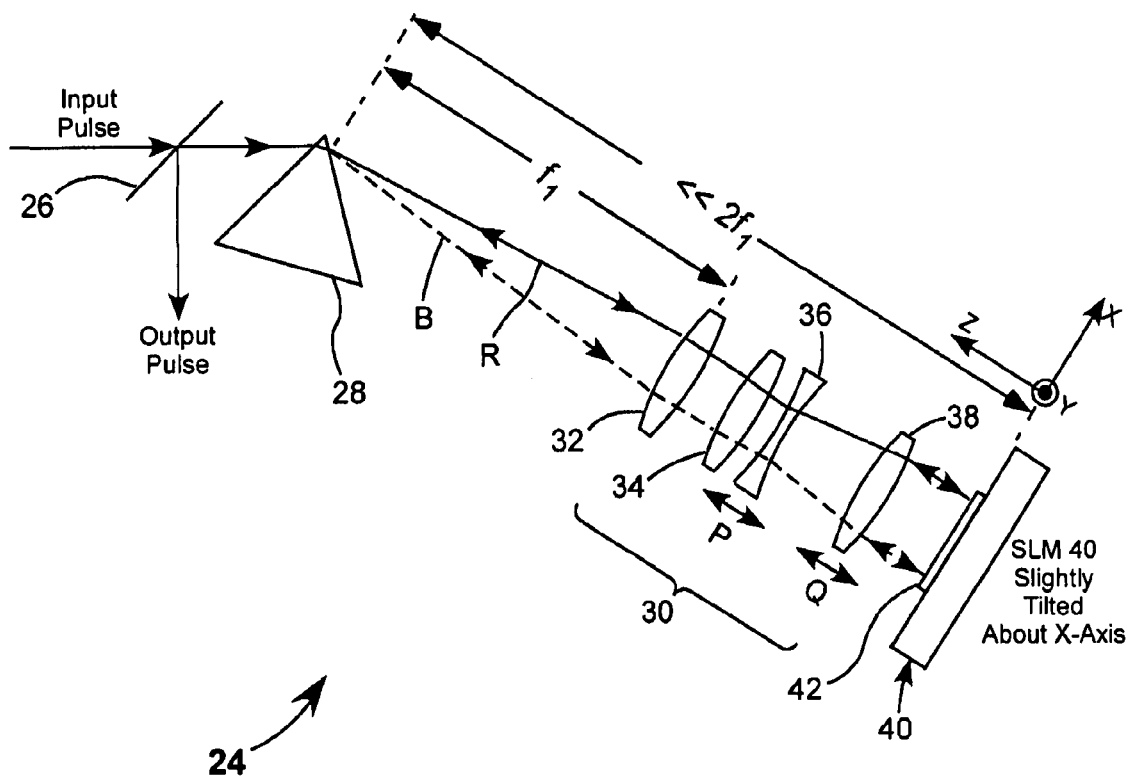
FIG. 2 schematically illustrates one preferred embodiment of a pulse-shaper in accordance with the present invention including a prism for dispersing a pulse into a fan of rays corresponding to spectral components of the pulse, a zoom lens located a back focal-length thereof away from the prism and arranged to collimate the spectral-component rays, a reflective SLM arrangement located significantly less than a back focal-length of the zoom lens away from the zoom lens and arranged to modulate the collimated spectral-component rays and direct the modulated, collimated spectral-component rays back through the zoom lens such the modulated spectral-component rays are focused by the zoom lens back onto the prism and reassembled by the prism into a temporally shaped pulse.

Continuing with reference to the drawings, wherein like components are designated by like reference numerals, FIG. 2 schematically illustrates one preferred embodiment 24 of a pulse-shaper in accordance with the present invention. Pulse-shaper 24 includes a prism 28, a zoom lens 30, and a spatial-light-modulator (SLM) 40 including a linear array of modulating elements (pixels) 42. Cartesian X-, Y- and Z-axes are depicted for reference. SLM 40 in this configuration is used in a reflective mode. This can be achieved in an SLM having reflective pixels or in an SLM having transmissive pixels backed by a reflector. SLMs of various types are readily commercially available. The operation of SLMs is well known to those skilled in the art to which the present invention pertains, and a detailed description thereof is not necessary for understanding principles of the present invention. Accordingly, such a detailed description is not presented herein.

Zoom lens 30 includes a focusing element 32 and an afocal variable beam expander/reducer group, here, including a positive element 34 a negative element 36 and another positive element 38. Elements 34 and 36 are axially movable as indicated by arrows P and Q respectively for changing the magnification of the zoom lens. Those skilled in the art will recognize that this is only one of several possible configurations of a zoom lens. Others may include more or less optical elements with more or less than two elements being axially movable. Moveable zoom-lens elements are typically moved simultaneously by a multiple cam arrangement as is known in the art. The configuration of zoom lens 30 should not be construed as limiting the present invention.

An input pulse (beam) enters apparatus 24 under a pick-off mirror 26 and is incident on the tip of a prism 28. Prism 28 spreads the beam into a fan of rays diverging in the plane of the drawing, i.e., in the X-Z plane. The fan of rays is bounded, as in the prior-art example described above, by a longest-wavelength ray R and a shortest-wavelength ray B, with the angle between rays R and B being dependent on the spectral bandwidth of the pulses and refractive index dispersion of the prism. Zoom lens 30 collimates the diverging rays, such that a collimated bundle of rays is incident on modulating-element array 42 of SLM 40. Preferably the zoom lens is adjusted such that the collimated ray bundle fills the array. This provides for accommodating pulses of different spectral bandwidth.

The modulating elements of array 42 are adjusted to change the phase or amplitude of certain of the collimated rays (spectral components of the pulse). Reflected modulated spectral components of the pulse are directed back through zoom lens 30 which focuses the spectral components back on prism 28. Prism 28 reassembles the modulated spectral components to provide a temporally shaped pulse. SLM 40 is tilted slightly, for example about a degree or less, about the X-axis. This causes the focused components to be incident on the prism at the same point in the X-axis but higher in the Y-axis, such that the temporally shaped pulse is incident on pick-off mirror 26 which directs the pulse out of the apparatus.

Zoom lens 30 is positioned at a Z-axis distance from the tip of prism 28 about equal to the back focal length $f_1$ of the zoom lens. Modulator element array 42 of SLM 40 is positioned close to the zoom lens, definitely not in a Fourier-plane of the lens, i.e., definitely not in the front focal plane of the zoom lens, such that the modulator element array is at a significantly less than $2f_1$ from the tip of prism 28. It should be noted, here that, the proportions of zoom lens 30 relative to the indicated distance $f_1$ are exaggerated for convenience of illustration. It should be noted that the terminology "significantly less" as used herein means that a distance is less by an amount greater than any acceptable tolerance in locating a Fourier-plane in a prior art Fourier-plane pulse-shaper.

The total optical length of apparatus 24 is significantly less than would be the case if the apparatus were configured in a prior-art folded $4f_1$ configuration, wherein the total length would be $2f_1$. It is believed, however, that not positioning SLM 40 in a Fourier-plane may result only in somewhat lesser resolution than would be possible if the SLM were in a Fourier-plane. Those skilled in the art will recognize, without further illustration or detailed description, that the physical length of apparatus 24 could be shortened by folding the optical path between the prism and the zoom lens.

Figure 3:
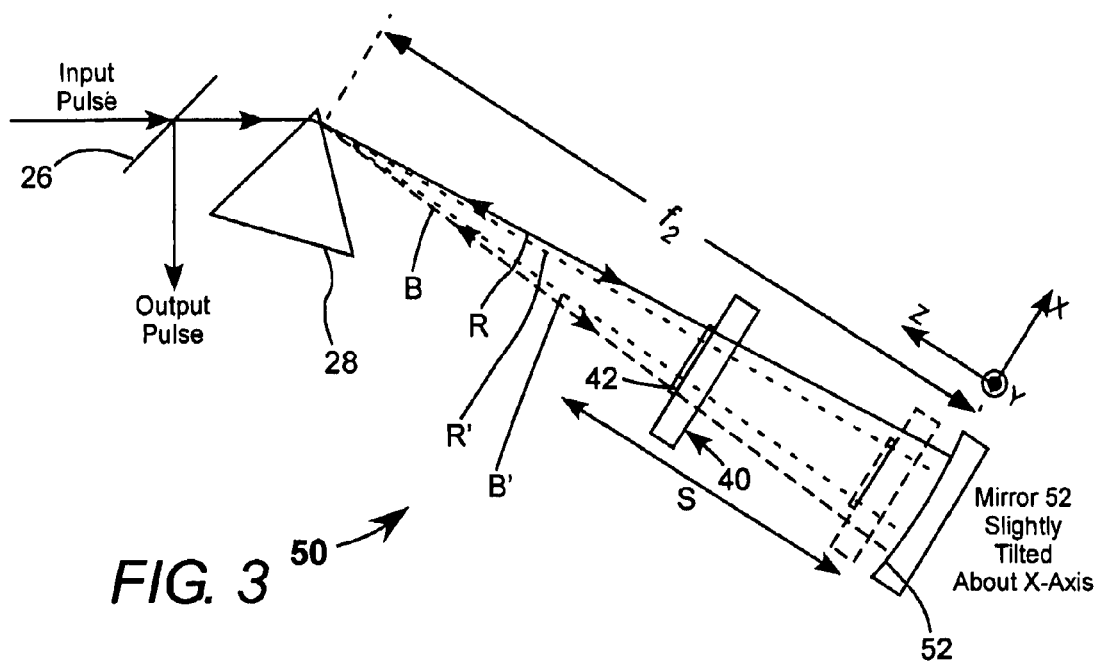
FIG. 3 schematically illustrates another preferred embodiment of a pulse-shaper in accordance with the present invention including a prism for dispersing a pulse into a fan of rays corresponding to spectral components of the pulse, a transmissive SLM arrangement arranged to modulate the spectral-component rays, and a concave lens located a focal length thereof from the prism and arranged to focus the modulated, spectral-component rays back through SLM onto the prism such that the modulated spectral-component rays are reassembled by the prism into a temporally shaped pulse.

FIG. 3 schematically illustrates another preferred embodiment 50 of a pulse-shaper in accordance with the present invention. Pulse-shaper 50 is similar to pulse-shaper 24 of FIG. 3 with exceptions as follows. In pulse-shaper 50, zoom lens 30 is omitted and refocusing of spectral components is effected by a concave mirror 52 having a focal length $f_2$ and located in the Z-axis at an optical distance about equal to $f_2$. SLM 40 is used in a transmissive mode. Reflector 52 is slightly tilted about the X-axis such that the temporally shaped pulse is intercepted by mirror 26 as discussed above. SLM 40, here, is movable along the Z-axis as indicated by arrow S for accommodating pulses of different spectral bandwidth within the full length of the modulator-element array of the SLM. This is exemplified in FIG. 3 by dotted rays R' and B' having a narrower angle therebetween than rays R and B, with SLM 40 indicated in phantom in a Z-axis shifted position. In a transmissive SLM wherein modulating elements are liquid crystal elements, the modulating elements are very much higher than they are wide, for example about 5 millimeters (mm) high and about 100 micrometers (.mu.m) wide. As the SLM tilt-angle about the X-axis will usually be less than about 1 degree spectral-component rays can easily pass through the modulator elements in both directions.

Clearly the optical length of pulse-shaper 50 is less than the optical length of pulse-shaper 24 of FIG. 2. In fact, pulse-shaper 50 has only one-half the length of a prior-art folded 4f pulse-shape having an optical element of the same focal length with the SLM in a Fourier-plane of that element.

The physical length of pulse-shaper 50 may be shortened by folding the optical path between prism 28 and the SLM. In one possible such modification, SLM 40 can be located in a fixed position close to reflector 52 and the path-folding can be accomplished by a pair of mirrors, tiltable as a pair about the Y-axis such that the path length can be incrementally adjusted for accommodating pulses of different spectral bandwidth. In such an arrangement, however, it would be necessary to change the focal length of the mirror with each incremental adjustment. This could be done using fixed focal length mirrors or by providing a mirror having a selectively variable focal length. Prior-art, Fourier-plane, pulse-shapers including arrangements for varying optical path length are described in above-referenced U.S. patent application Ser. No. 11/602, 147. A Fourier-plane pulse-shaper including a zoom mirror is also described in this patent application.

It should be noted that while embodiments of the present invention discussed above employ as a prism as a wavelength dispersive device, principles of the invention are equally applicable if some other wavelength-dispersive device, such as a diffraction grating or a grism, is used. A particular embodiment of a pulse-shaper in accordance with the present invention including a pair of grisms is described further hereinbelow.

Figure 4:
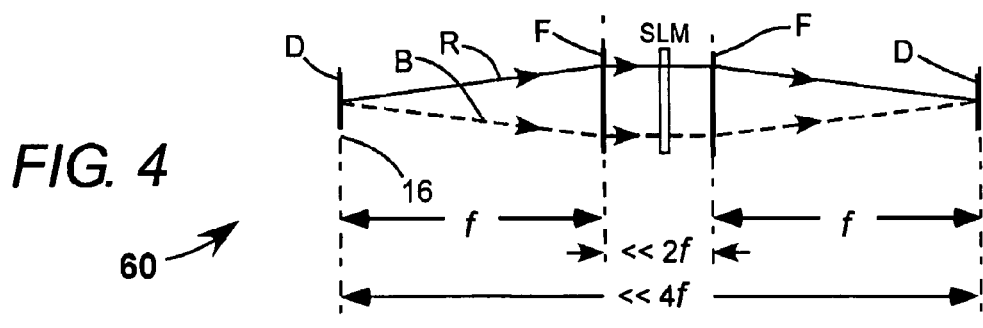
FIG. 4 schematically illustrates one generalized form of a pulse-shaper in accordance with the present invention in which a pulse is dispersed by a first dispersive device into a fan of rays corresponding to spectral components of the pulse, the spectral-component rays are collimated by a first optical element having a focal length and located a focal length thereof away from the first dispersive device, the collimated spectral-component rays are modulated by a spatial-light-modulator (SLM) located significantly less than a focal length of the first optical element away from the first optical element, the modulated, collimated spectral-component rays are focused by a second optical element having the focal length of the first optical element and located significantly less than focal length thereof away from the SLM, and the focused modulated spectral-component rays are reassembled into a temporally shaped pulse by a second dispersive device located a focal length away from the second optical element.

FIG. 4 schematically illustrates one generalized form 60 of a pulse-shaper in accordance with the present invention in which a pulse is dispersed by a first wavelength-dispersive device D into a fan of rays corresponding to spectral components of the pulse, and bounded by longest-wavelength and shortest wavelength rays R and B, respectively, as discussed above. The spectral-component rays are collimated by a first optical device F having positive optical power and a corresponding focal length f. The collimating device F is located at an optical distance f from the first wavelength-dispersive device D. The collimated spectral-component rays are modulated by a spatial-light-modulator (SLM) located at an optical distance significantly less than f from collimating device F. The modulated, collimated spectral-component rays are focused by a second optical device having positive power and having the same focal length as the collimating device F. This focusing device F is located at an optical distance significantly less than f away from the SLM. The focused modulated spectral-component rays are reassembled into a temporally shaped pulse by a second wavelength dispersive device D located at an optical distance f away from collimating device F. This arrangement of the inventive pulse-shaper has a total optical length significantly less than 4f and preferably has a length less than 3f.

Figure 5:
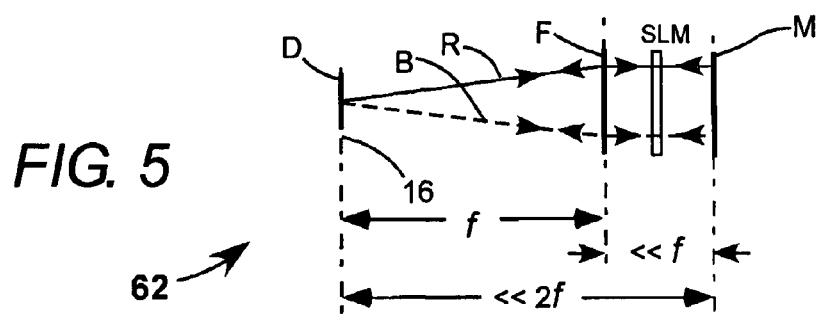
FIG. 5 schematically illustrates another generalized form of a pulse-shaper in accordance with the present invention in which a pulse is dispersed by a dispersive device into a fan of rays corresponding to spectral components of the pulse, the spectral-component rays are collimated by an optical element having a focal length and located a focal length thereof away from the dispersive device, the collimated spectral-component rays are modulated by a reflective SLM arrangement located significantly less than a focal length of the optical element away from the optical element and directed back to the optical element such that the modulated collimated spectral-component rays are focused by the optical element back onto the dispersive device and are reassembled into a temporally shaped pulse by the dispersive device.

FIG. 5 schematically illustrates another generalized form 62 of a pulse-shaper in accordance with the present invention. This form is similar to arrangement 60 of FIG. 4 with an exception that a reflective SLM arrangement is utilized such that the same wavelength-dispersive device D can be used to disperse and reassemble spectral-component rays, and the same device F having positive optical power can be used to collimate spectral-component rays and focus modulated spectral-component rays. The reflective SLM arrangement is located at a distance significantly less than f from the collimating and focusing device. In this arrangement, the reflective SLM arrangement is depicted as a transmissive SLM backed by a mirror M. The reflective SLM could also be a SLM having reflective modulating elements. This arrangement of the inventive pulse-shaper also has a total (round-trip) optical length significantly less than 4f, folded to a one-way length significantly less than 2f. Those skilled in the art will recognize that pulse-shaper 24 of FIG. 2 has the general form 60, with wavelength dispersive device D being a prism, and collimating and focusing device F being a zoom lens, with f being the back focal length of the zoom lens.

Figure 6:
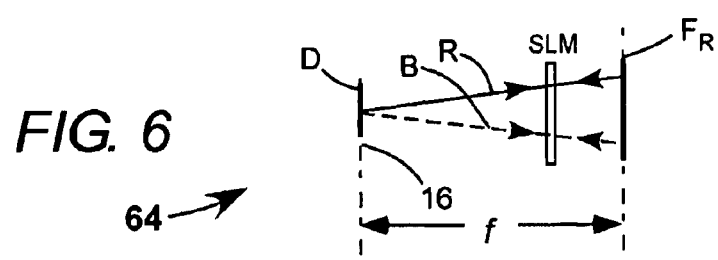
FIG. 6 schematically illustrates yet another generalized form of a pulse-shaper in accordance with the present invention in which a pulse is dispersed by a dispersive device into a fan of rays corresponding to spectral components of the pulse, the spectral-component rays are modulated by a transmissive SLM arrangement, the modulated spectral-component rays are incident on a reflective optical element having positive optical power and located a focal length thereof from the dispersive device, the reflective optical element being arranged to focus the modulated spectral-component rays back through the SLM arrangement onto the dispersive device such that the dispersive device reassembles the modulated spectral-component rays into a temporally shaped pulse.

FIG. 6 schematically illustrates yet another generalized form 64 of a pulse-shaper in accordance with the present invention in which a pulse is dispersed by a wavelength-dispersive device D into a fan of rays corresponding to spectral components of the pulse. The spectral-component rays are modulated by a transmissive SLM arrangement. The modulated spectral-component rays are incident on a reflective optical element $F_R$ having positive optical power and located a distance f from the wavelength-dispersive device. The reflective optical device is arranged to focus the modulated spectral-component rays back through the SLM arrangement onto wavelength-dispersive device D such that the wavelength-dispersive device reassembles the modulated spectral-component rays into a temporally shaped pulse. This arrangement has a total optical length of 2f folded to an optical length of f. Those skilled in the art will recognize that pulse-shaper 50 of FIG. 3 has the general form 64.

Those skilled in the art will also recognize from the description of the present invention provided herein that in any of the general forms described above one or more additions or modifications are possible. By way of example, any of the optical devices having positive optical power and used for collimating or focusing can included lenses or mirrors and can have either fixed or selectively-variable optical power. The wavelength-dispersive devices can include a prism, a grating, or a grism. Relatively long optical distances can be physically shortened by optical folding devices, either fixed or incrementally variable, or by optical telescopes either fixed or variable. These and other modifications or additions may be made without departing from the spirit and scope of the present invention.

Each of the above-described embodiments of the present invention has at least one optical device that has positive optical power such as a lens or a concave mirror. For any such device, a Fourier-plane can be defined at a focal distance from the device. In the inventive pulse-shapers the SLM is definitely not in such a Fourier-plane, and in fact it is not necessary that optical arrangements of the inventive pulse-shapers have a definable Fourier-plane of even a device having positive optical power.

Figure 7:
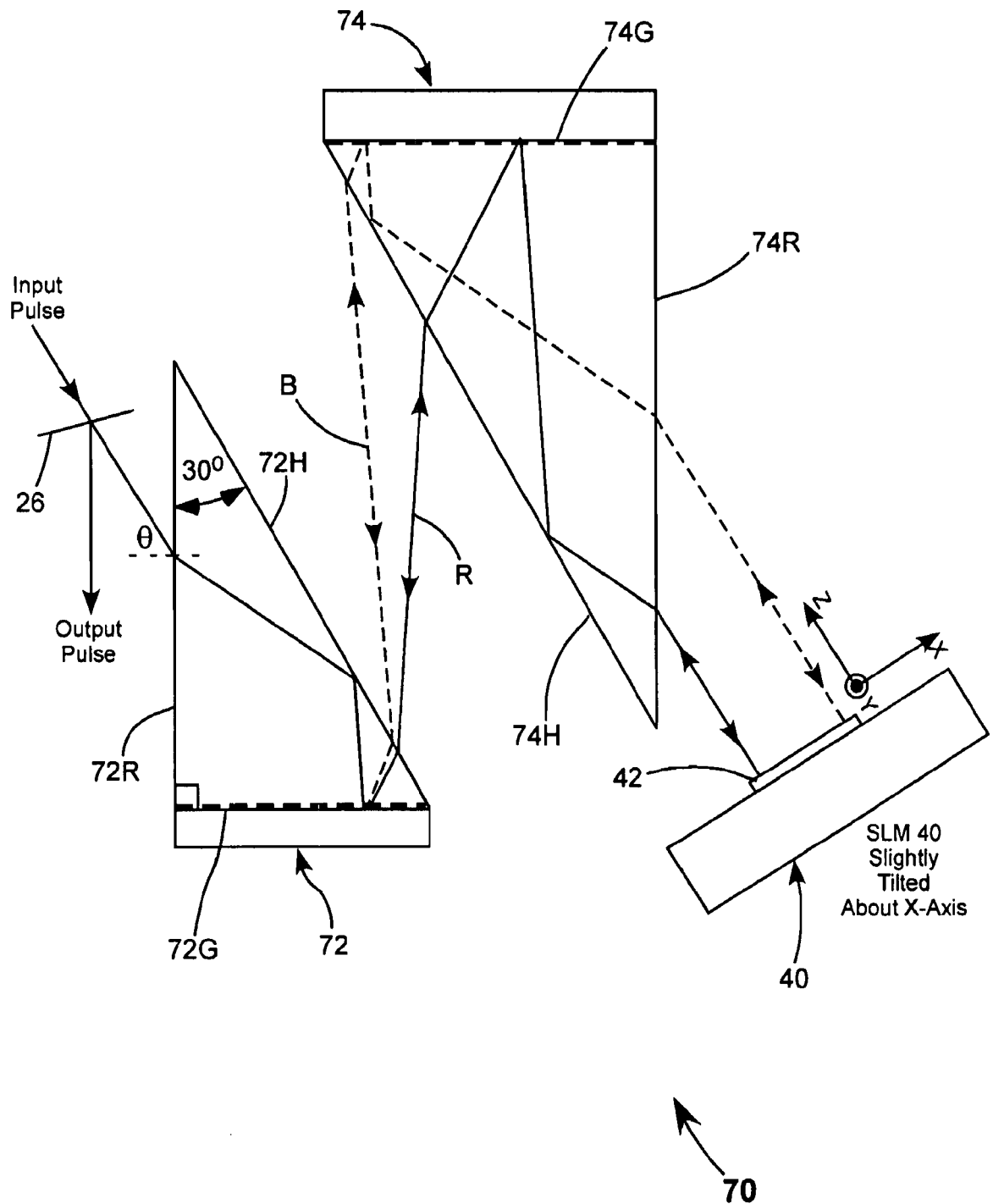
FIG. 7 schematically illustrates yet a preferred embodiment of a pulse-shaper and pulse compressor in accordance with the present invention including a first grism for dispersing a pulse into a fan of rays corresponding to spectral components of the pulse, a second grism arranged to receive the fan of rays from the first grism and collimate the fan of rays, and a reflective SLM arrangement arranged to receive the collimated spectral-component rays, modulate the collimated spectral-component rays, and direct the modulated, collimated spectral-component rays back through the first and second grisms such the modulated spectral-component rays are recombined to from a temporally shaped pulse on exiting the first grism.

By way of example FIG. 7 schematically illustrates an embodiment 70 of a pulse-shaper in accordance with the present invention that does not include a lens or a mirror having positive optical power. Pulse-shaper 70 includes two grisms 72 and 74. Grism 72 has a grating face 72G, a specular face 72R perpendicular thereto and a specular hypotenuse face 72 H. There is an angle of 30° between faces 72R and 72H and accordingly an angle of 60° between faces 72G and 72H. Grism 74 has a grating face 74G and specular faces 74R and 74 H. The angles between faces 74G, 74R, and 74H are as specified for corresponding faces of grism 72. The grisms are arranged with grating faces thereof parallel to each other, and with hypotenuse faces thereof spaced-apart and parallel to each other.

An input pulse (beam) passes under pick-off mirror 26 and is incident on face 72R of grism 72 at an angle θ. Angle θ is selected, dependent on the material of the grism, such that the beam enters the grism, undergoes total internal reflection (TIR) at face 72H of the grism, and is incident on grating face 72G of the grism. Grating face 72G diffracts the beam incident thereon in to fan (diverging bundle) of rays in the plane of the drawing (the X-Z plane). The fan of rays is bounded by a shortest-wavelength ray B (dashed line) and a longest-wavelength ray R (solid line) All rays in the diffracted fan thereof are incident on face 72H of the grism 72 at less than the critical angle and accordingly are transmitted out of face 72H. The divergence of the fan of rays is increased on leaving grism 72.

The fan of rays from grism 72 enters grism 74 via face 74H thereof. After transmission through face 74H the divergence angle of the fan of rays is decreased back to that divergence angle that prevailed on diffraction from grating-face 72G of grism 72. Grating face 74G of grism 74 is arranged such that after diffraction therefrom the diverging bundle of rays incident thereof is rendered parallel, undergoes TIR from face 74H and exits grism 74, via face 74R thereof still essentially parallel. Parallel spectral-component rays in the bundle are incident on modulator-element array 42 of an SLM 40 used in a reflective mode. Modulated spectral-component rays are directed back through grisms 74 and 72 to be re-combined on leaving grism 72 as a temporally shaped pulse. SLM 40 can be spaced at any convenient distance from grism 74. Spacing between face 72H of grism 72 and face 74H of grism 74, in this embodiment is preferably selected to allow the fan of rays to diverge sufficiently that a pulse having the largest spectral bandwidth contemplated will fill modulator element array 42 of SLM 40.

In the arrangement of FIG. 7 in which the grisms are made from BK7 glass having a refractive index of about 1.52, and the grating faces thereof each have a grating period of about 1.67 micrometers (μm), i.e., about 600 lines per mm ruling, a preferred value for angle θ is about 58°. This provides an incidence angle on face 72H of about 63.9°. The incidence angle of the beam on grating face 72G is about 3.9°. In a wavelength range from about 700 nanometers (nm) to about 900 nm the divergence angle of rays from grating face 72G, in the grism, is about 0.030° per nanometer of spectral band width. This translates to a divergence of about 0.075°/nm between hypotenuse-faces 72H and 74H of the grisms.

Apparatus 70 functions as a pulse compressor in addition to functioning as a pulse-shaper. When an ultrashort pulse having a broad spectral bandwidth propagates through a glass material, shorter wavelengths in the pulse-spectrum are slowed more with respect to the longer wavelengths because of the normal refractive dispersion of the glass. This effect is called positive group velocity dispersion (GVD) or group delay dispersion (GDD) and has a temporal broadening effect on the pulse, often referred to as pulse stretching. (GVD or some called it GDD, or linear dispersion) broadens or stretches the ultrashort pulse.

In order to compensate for this negative GDD in an optical system for ultrashort pulses it is usual to provide an optical arrangement for temporally compressing the stretched pulse, i.e., an arrangement that provides negative GVD. This is provided in apparatus 70 because the arrangement of the grisms causes spectral-component rays to follow a longer path in grism 74 the longer the wavelength of the spectral-component ray. This provides a very much greater negative GVD than the positive GVD resulting from the refractive index dispersion of the glass of the grism. In the arrangement of FIG. 7, grism 74 can provide a negative GVD of about 10,000 femtoseconds squared ($fs^2$). This could be increased or decreased according by selecting appropriate criteria, such as the grating period, the prism angles and size, the refractive index of the prism, and the spacing of grisms. Negative GVD, introduced to spectral-component rays on both forward and reverse passes through grism 74, provides that the duration of the temporally shaped output pulse is reduced compared with that of the input pulse.

It is emphasized here that stretching or compressing a pulse is different from changing the temporal shape of as pulse by selectively modulating spectral components of the pulse. By way of example a pulse having a Gaussian temporal shape and a first pulse duration, can be compressed to provide a pulse still having a Gaussian shape but having a second pulse duration shorter than the first pulse duration. The term "temporally shaping" a pulse, as defined herein means changing the actual temporal shape of a pulse independent of the duration, for example, changing a pulse having a Gaussian temporal shape to a pulse having some non-Gaussian temporal shape.

It should be noted here that there will be some finite wave-length-dispersion of the input pulse due to refraction at specular face 72R of grism 72. This is, however, not indicated in FIG. 7 as this wavelength-dispersion is negligible compared to the wavelength dispersion provided by the grating face of the grism. It is because of this finite dispersion that the term "essentially parallel" is used to describe spectral-component rays incident on SLM 40. By way of example, if the spectral-component rays leave grating face 74G of grism 74 exactly parallel, the rays will not be exactly parallel on exiting face 74R of the grism, however, the departure from parallelism will be less than one-tenth of a degree. Rays could be made more parallel on exiting the grism by making small adjustments in one or more parameters of the grism such as the grating period, i.e., by creating a situation wherein the rays are not exactly parallel on diffraction from the grating face 74G and become more parallel on exiting hypotenuse face 74H. Those skilled in the art may make other variations in the arrangement of FIG. 7 without departing from the spirit and scope of the present invention.

Figure 7A:
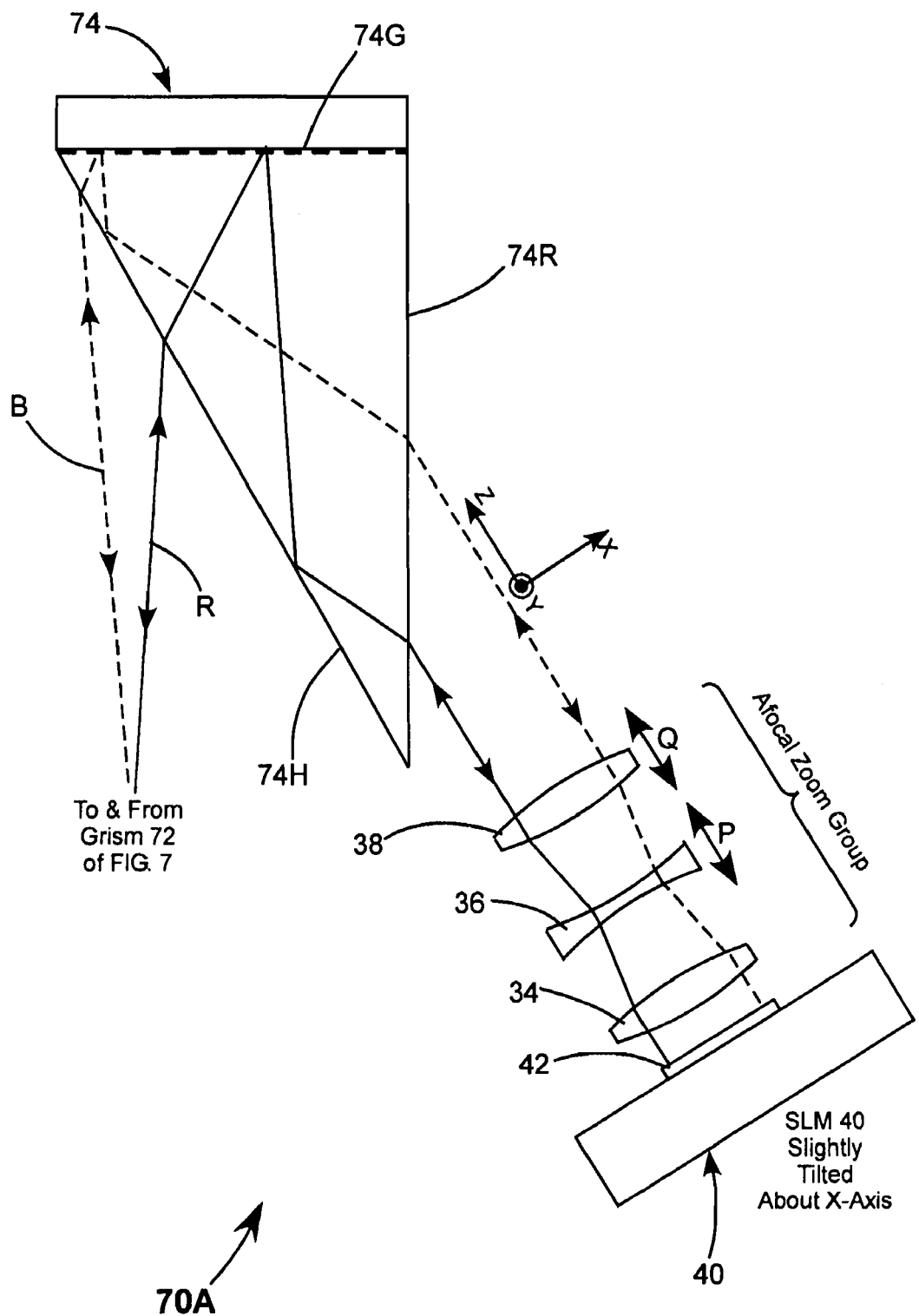
FIG. 7A schematically illustrates another preferred embodiment of a pulse-shaper and pulse-compressor in accordance with the present invention similar to the pulse-shaper and compressor of FIG. 7, but further including a three-element afocal zoom-lens group located between the second grism and the SLM.

FIG. 7A schematically illustrates another embodiment 70A of a pulse-shaper in accordance with the present invention including two grisms. Pulse-shaper 70A is similar to pulse-shaper 70 of FIG. 7 with an exception that pulse-shaper 70A further includes lens elements 34, 36, and 38 arranged as an afocal, variable (zoom) beam expander/reducer between hypotenuse face 74H of grism 74 and SLM 40. Elements 36 and 38 are simultaneously movable, as indicated by arrows P and Q respectively for changing the magnification of the group. This allows pulses of different bandwidth to be shaped while filling the whole length of modulator-element array 42. The position of SLM 40 with respect to the afocal group is not critical. Elements 34, 36, and 38, considered as a group, have zero optical power in the designed magnification range and there is no Fourier-plane identifiable for the group. Sufficient space between the afocal zoom group and grism 74 must be allowed to accommodate the range of movement of lens elements 36 and 38.

Figure 8:
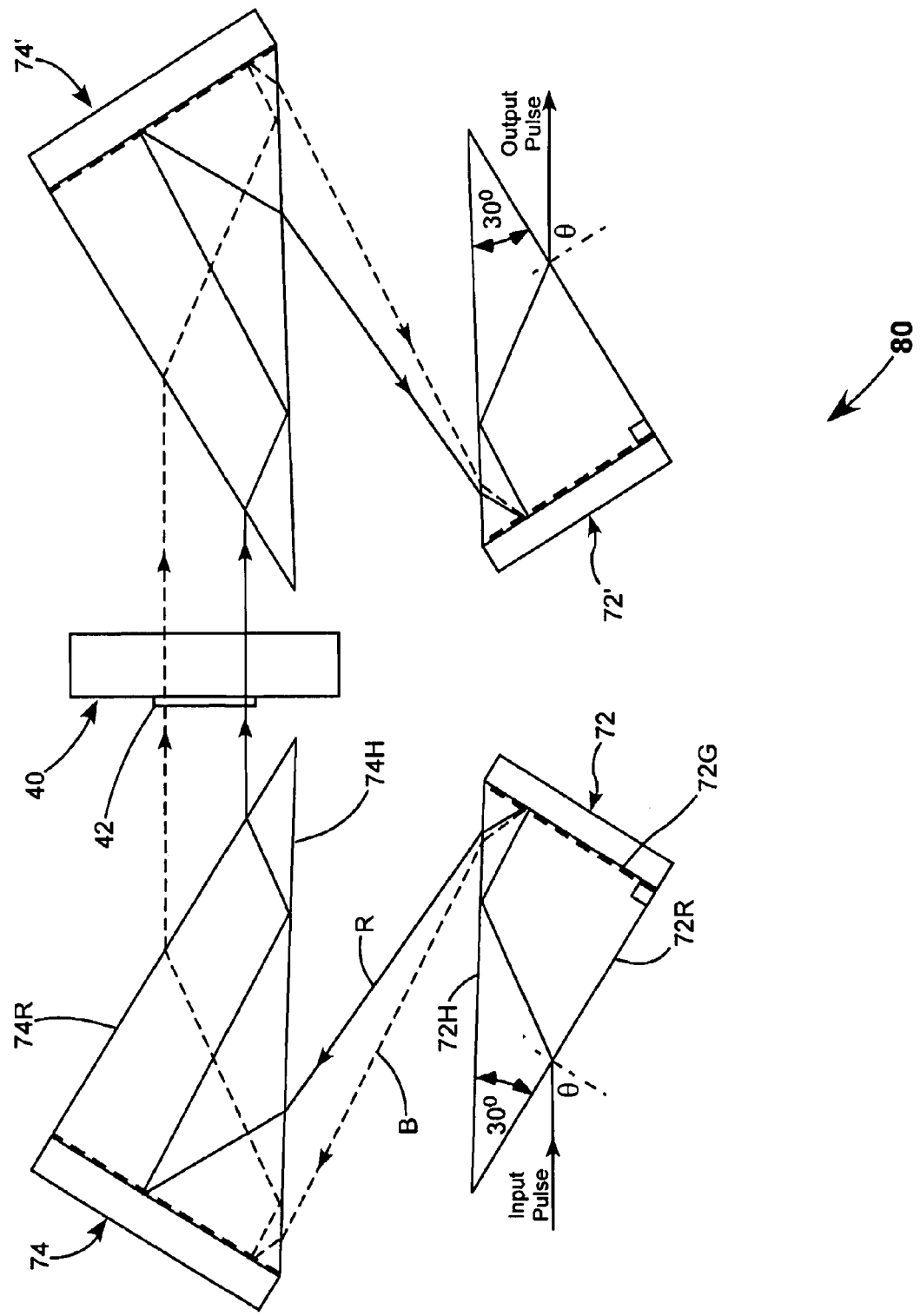
FIG. 8 schematically illustrates yet another preferred embodiment of a pulse-shaper and compressor in accordance with the present invention similar to the pulse-shaper and compressor of FIG. 7, but wherein the SLM arrangement is transmissive and recombination of the spectral-component rays is effected by third and fourth grisms similar in configuration and arrangement to respectively the second and first grisms.

FIG. 8 schematically illustrates a further preferred embodiment 80 of a pulse-shaper in accordance with the present invention similar to pulse-shaper 70 of FIG. 7, but wherein SLM 40 used in a transmissive mode. Recombination of the spectral-component rays modulated by the SLM is effected by a grism 74' similar to grism 74 and a grism 72' similar to grism 72. In this arrangement, there is no requirement to tilt SLM 40 about the X-axis for separating output from input. A variable beam-expander (afocal zoom-group) could be included between grism 74 and SLM 40 as described above with reference to FIG. 7A. It will, however, be necessary also to include a second variable beam-expander between the SLM and grism 74' with the first and second beam expanders preferably adjusted such that the beam-width leaving grism 74 is the same as the beam-width entering grism 74'.

Figure 9:
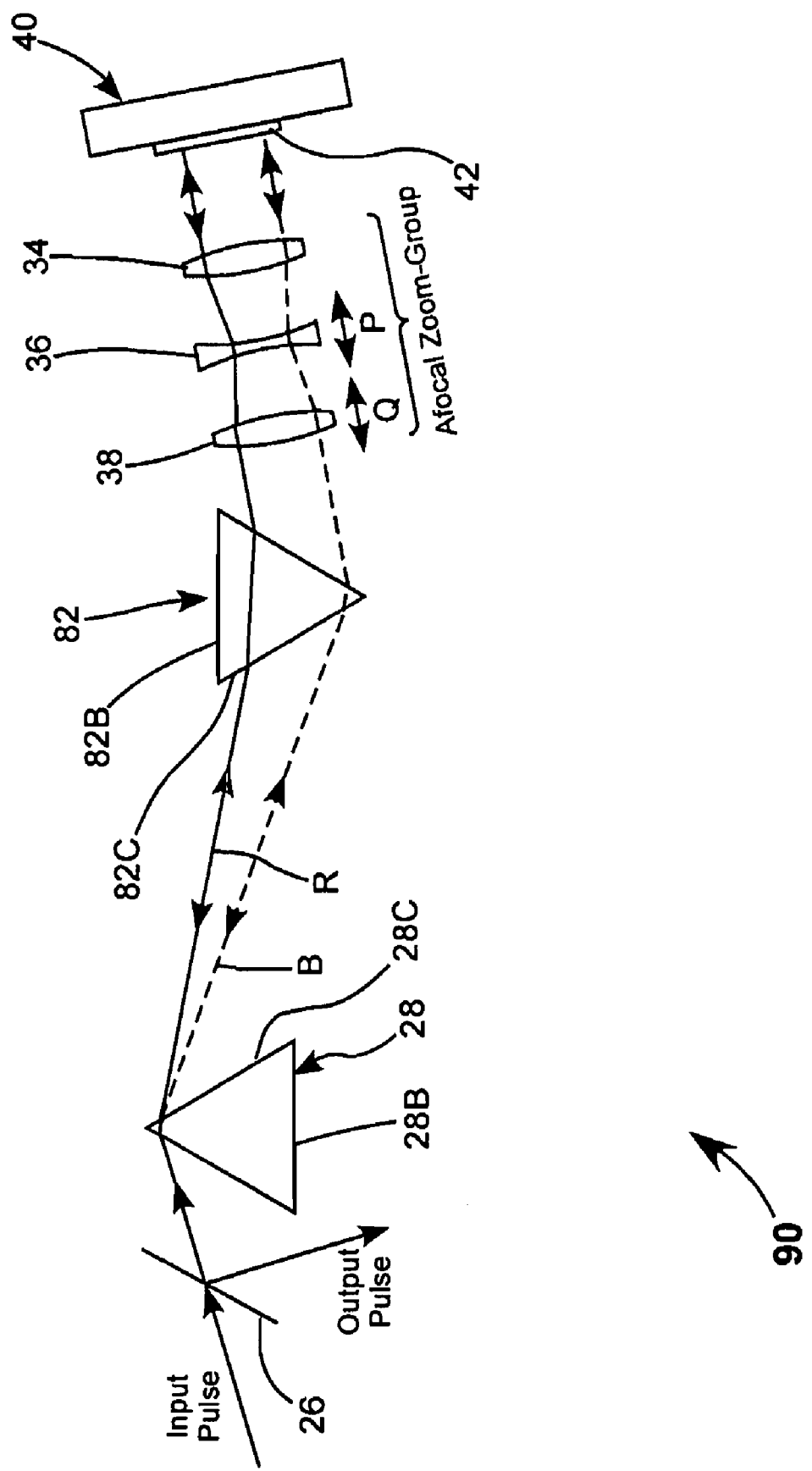
FIG. 9 schematically illustrates still another preferred embodiment of a pulse-shaper and compressor in accordance with the present invention, similar to the pulse-shaper and compressor of FIG. 7A but wherein the first and second grisms are replaced by first and second prisms.

FIG. 9 schematically illustrates still another preferred embodiment 90 of a pulse-shaper and compressor in accordance with the present invention, similar to the pulse-shaper and compressor 70A of FIG. 7A but wherein grisms 72 and 74 of pulse-shaper and compressor 70A are replaced by prisms 28 and 82. The prisms, here, are isosceles prisms arranged spaced apart with a base faces 28B and 82B thereof parallel to each other and with corresponding input and outfaces 28C and 82C thereof parallel to each other. In pulse-shaper and compressor 90, prism 28 spreads an input pulse into a diverging fan of spectral-component rays in the manner of prism 28 of pulse-shaper 24 of FIG. 2. As in the drawing of FIG. 2, in FIG. 9 the divergence of the fan of rays from prism 28 is exaggerated, and in FIG. 9, the spacing of the prisms is foreshortened for convenience of illustration. With the prisms configured and arranged as shown, the fan of spectral-component rays from prism 28 is collimated by prism 82. The collimated spectral-component rays are delivered through an afocal zoom-group comprising lens elements 34, 36, and 38 to an SLM 40 including a linear array 42 of modulating elements for modulating the spectral-component rays. The modulated spectral-component rays then return trough the zoom-group and prisms 82 and 28 and are recombined into a temporally shaped pulse. Prism 82 introduces negative GVD to spectral-component rays on both forward and reverse passes therethrough such that the duration of the temporally shaped pulse is reduced compared with that of the input pulse.

Figure 10:
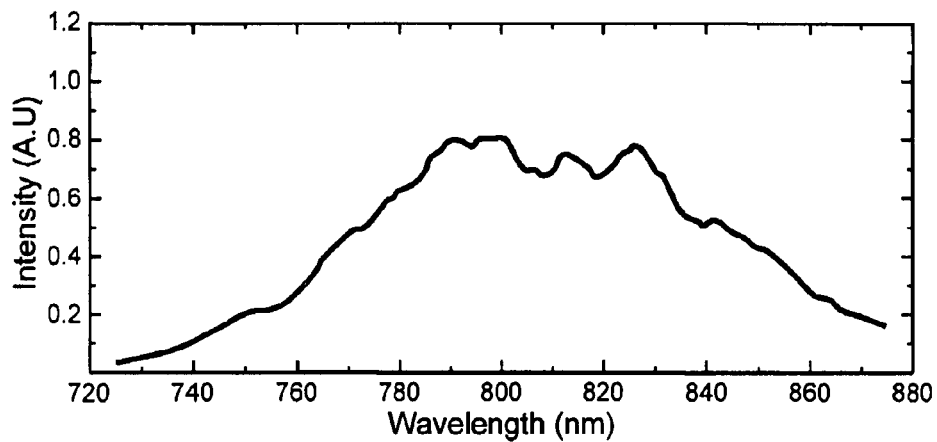
FIG. 10 is a graph schematically illustrating an example of an input pulse spectrum for modulation in an example of a pulse-shaper and compressor similar in arrangement to the pulse-shaper and compressor of FIG. 9 but without a zoom group between the second prism and the SLM.
Figure 11:
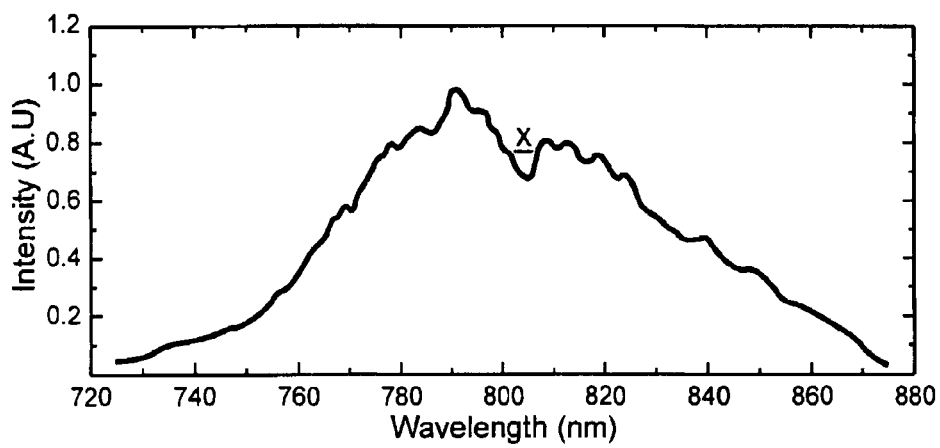
FIG. 11 is a graph schematically illustrating an example of an output pulse from the example of the pulse-shaper and compressor similar of FIG. 10 wherein the transmission of one about centrally located pixel of the SLM was set to zero.
Figure 12:
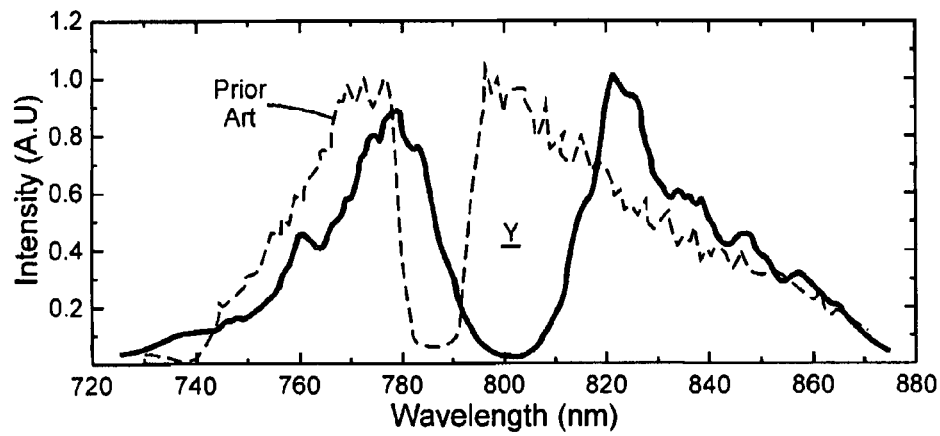
FIG. 12 is a graph schematically illustrating an example of an output pulse from the example of the pulse-shaper and compressor similar of FIG. 10 wherein the transmission of seventeen pixels of the SLM was set to zero.

Examples of selective modulation of pulses in assemblies formed in accordance with the present invention are graphically schematically illustrated in FIG. 10, FIG. 11, and FIG. 12. The apparatus in which the results were obtained is configured similar to apparatus 90 of FIG. 9 but without an afocal zoom group between prism 82 and SLM 40. Prisms 28 and 82 are SF-2 isosceles prisms spaced apart by about 900 mm. SLM 40 is located about 100 mm from prism 82.

FIG. 10 is a graph schematically illustrating the measured spectrum of an input pulse. This graph, and the graphs of FIGS. 11 and 12 are each reproduced from a corresponding image of an oscilloscope trace. It should be noted that there is certain noise in such measurements such that the graphs would not be exactly reproducible from one measurement to another.

FIG. 11 is a graph schematically illustrating the form an output pulse from the above-described apparatus in which the transmission of one pixel (one resolution element) was set to zero so that the SLM did not reflect back from that pixel location. This produced a dip in the spectrum indicated in FIG. 11 by the letter X. It can be seen that the resolution of the apparatus is not comparable to the resolution of the SLM with a result that the modulation of the spectrum is only on the order of about 15%. It should be noted that applications in which only one pixel was modulated would be very rare.

FIG. 12 is a graph schematically illustrating the form an output pulse from the above-described apparatus in which the transmission of seventeen pixels, eight on either side of the pixel of FIG. 11, were set to zero. This produced a broad dip in the spectrum indicated in FIG. 12 by the letter Y. Here in the center of the dip modulation of the spectrum is close to 100%. An effect of the resolution of the apparatus being less than that of the SLM is manifest in the non-vertical slope of the sides of the dip. By way of comparison, spectral modulation by an SLM in Fourier plane in apparatus of the above reference Resan et al. application is depicted in FIG. 12 by a dashed curve. It is believed, however, that in many applications the resolution of apparatus in accordance with the present invention will be adequate.

Those skilled in that art will recognize from the description of the present invention provided herein that not only is it possible to combine the functions of a pulse-shaper and a pulse-compressor using principles of the present invention, but also possible to combine the functions of a pulse-stretcher and a pulse compressor. Such combinations may be made without departing from the spirit and scope of the present invention.

In summary, the present invention is described above in terms of a preferred and other embodiments. The invention is not limited, however, to the embodiments described and depicted. Rather, the invention is limited only by the claims appended hereto.

What is claimed is:

1. Apparatus for temporally shaping an optical pulse to provide a temporally shaped optical pulse, comprising:

first and second wavelength-dispersive optical devices;

first and second optical devices having positive optical power each thereof having a focal length and being located between said first and second wavelength-dispersive optical devices;

a transmissive spatial-light-modulator located between said first and second positive-optical-power optical devices;

said first wavelength-dispersive optical device being arranged to disperse the optical pulse into a diverging fan of rays corresponding to spectral-components of the pulse;

said first positive-optical-power optical device arranged to collimate said fan of spectral-component rays;

said spatial-light-modulator arranged to selectively modulate said collimated spectral-component rays;

and said second positive-optical-power optical device arranged to focus said fan of selectively modulated spectral-component rays onto said second wavelength dispersive device such that said selectively modulated spectral-component rays are combined thereby to provide the temporally shaped pulse; and wherein said first and second optical positive-optical-power optical devices are spaced apart by a distance significantly less than the sum of the focal lengths thereof.

2. The apparatus of claim 1, wherein said first and second positive-optical-power optical devices are spaced apart by a distance significantly less than a focal length of either thereof.

3. The apparatus of claim 1, wherein said first and second positive-optical-power optical devices have about the same focal length.

4. The apparatus of claim 3, wherein said first and second positive-optical-power optical devices are lenses.

5. The apparatus of claim 1, wherein said first and second wavelength-dispersive optical devices are essentially identical.

6. The apparatus of claim 1, wherein said first wavelength-dispersive optical device includes one of a prism, a diffraction grating, and a grism.

7. Apparatus for temporally shaping an optical pulse to provide a temporally shaped optical pulse, comprising:

a first grism being configured and arranged to receive the optical pulse and disperse the optical pulse into a diverging fan of rays corresponding to spectral-components of the pulse;

a second grism arranged to receive the fan of spectral-component rays from the first grism and collimate the fan of spectral-component rays; and a spatial-light-modulator in a reflective configuration arranged to receive collimated spectral-component rays from the second grism, selectively modulate the collimated-spectral-component rays and direct the spectral-component rays back through the first and second grisms such that the selectively modulated spectral-component rays are combined by the first and second grisms to provide the temporally shaped pulse.

8. The apparatus of claim 7, wherein each of the grisms has a grating face and first and second specular faces, and wherein the optical pulse enters the first grism via the first specular face thereof, is internally reflected from the second specular face thereof onto the grating face thereof is diffractively dispersed by the grating face thereof and exits the first grism via the second specular face thereof; and wherein the fan of rays from the first grism enters the second grism via the second specular face thereof, is collimated by diffraction at the grating face thereof, is internally reflected from the second specular face thereof exits the second grism via the first specular face thereof and are normally incident in one axis on the spatial-light-modulator.

9. The apparatus of claim 8, wherein the first and second grisms are isosceles grisms and are arranged with the grating faces thereof parallel to each other and with the second specular faces thereof parallel to each other.

10. The apparatus of claim 9, further including an afocal lens having a selectively variable magnification located between the second grism and the spatial-light-modulator.

11. Apparatus for temporally shaping and shortening the duration of an optical pulse to provide a compressed, temporally shaped optical pulse, comprising:
a first wavelength-dispersive optical device arranged to disperse the optical pulse into a diverging fan of rays corresponding to spectral-components of the pulse;
a second wavelength-dispersive optical device arranged to provide a wavelength dependent delay of the spectral-component rays;
a spatial-light-modulator arrangement for selectively modulating the spectral-component rays;
wherein the spectral-component rays, delayed and selectively modulated, are optically recombined to provide the compressed temporally shaped optical pulse; and
wherein each of the first and second wavelength-dispersive optical devices is a grism, the second grism is arranged to receive spectral-component rays from the first grism and direct the spectral-component rays to the spatial-light-modulator arrangement and, the spatial-light-modulator arrangement is arranged to reflect the spectral-component rays spectral-component rays back through the first and second grisms such that the rays are optically recombined to provide the compressed, temporally shaped optical pulse.

12. The apparatus of claim 11, wherein the spectral-component rays are recombined by third and fourth wavelength-dispersive optical devices.

13. Apparatus for temporally shaping and shortening the duration of an optical pulse to provide a compressed, temporally shaped optical pulse, comprising:
a first grism arranged to disperse the optical pulse into a diverging fan of rays corresponding to spectral-components of the pulse;
a second grism arranged to receive spectral-component rays from the first grism, provide a wavelength-dependent delay of the spectral-component rays; and
a spatial-light-modulator arrangement, arranged to receive spectral-component rays from the second grism, selectively modulate the spectral-component rays, and reflect modulated-spectral-component rays back through the second and first grisms such that the spectral-component rays, spectrally modulated and having a wavelength dependent delay, are optically recombined to provide the compressed, temporally shaped optical pulse.

14. The apparatus of claim 13, wherein each of the first and second grisms includes a grating face and two specular face and wherein the optical pulse enters the first grism via the first specular face thereof is internally reflected from the second specular face thereof onto the grating face thereof, is wavelength-dispersed into the fan of spectral-component rays by diffraction at the grating face, and exits the first grism via the second specular face thereof, such that the fan of spectral-component rays on exiting the grism has a greater divergence than the fan of spectral-component rays inside the grism.

15. The apparatus of claim 14, wherein the diverging fan of rays from the first grism enters the second grism via the second specular face thereof and is collimated by diffraction from the grating face of the second grism, and wherein the collimated specular component rays are internally reflected from the second specular face of the second grism and exit the second grism via the first specular face thereof.

16. Apparatus for temporally shaping and shortening the duration of an optical pulse to provide a compressed, temporally shaped optical pulse, comprising:
a first wavelength-dispersive optical device arranged to disperse the optical pulse into a diverging fan of rays corresponding to spectral-components of the pulse;
a second wavelength-dispersive optical device arranged to provide a wavelength dependent delay of the spectral-component rays;
a spatial-light-modulator arrangement for selectively modulating the spectral-component rays;
wherein the spectral-component rays, delayed and selectively modulated, are optically recombined to provide the compressed temporally shaped optical pulse; and
wherein each of the first and second wavelength-dispersive optical devices is a prism, the second prism is arranged to receive spectral-component rays from the first prism and direct the spectral-component rays to the spatial-light-modulator arrangement and, the spatial-light-modulator arrangement is arranged to reflect the spectral-component rays spectral-component rays back through the first and second prisms such that the rays are optically recombined to provide the compressed temporally shaped optical pulse.

* * * * *

UNITED STATES PATENT AND TRADEMARK OFFICE
CERTIFICATE OF CORRECTION

| | | |
|---|---|---|
| PATENT NO. | : 7,688,493 B2 | Page 1 of 1 |
| APPLICATION NO. | : 11/811462 | |
| DATED | : March 30, 2010 | |
| INVENTOR(S) | : Bojan Resan et al. | |

It is certified that error appears in the above-identified patent and that said Letters Patent is hereby corrected as shown below:

In face page, in column 1, in field 75, in "Inventors", in line 2, delete "Fray," and insert --Fry,--, therefor.

In column 1, line 51, change "function" to --function.--.

In column 4, line 34, delete "distanced" and insert --distance--, therefor.

In column 13, line 26, in claim 11, before "back" delete "spectral-component rays".

In column 14, line 41, in claim 16, before "back" delete "spectral-component rays".

Signed and Sealed this

Fifteenth Day of June, 2010

David J. Kappos
*Director of the United States Patent and Trademark Office*